United States Patent
Takehara

(10) Patent No.: US 11,563,935 B2
(45) Date of Patent: Jan. 24, 2023

(54) IMAGE DECODING DEVICE, IMAGE DECODING METHOD, AND IMAGE DECODING PROGRAM

(71) Applicant: JVCKENWOOD Corporation, Yokohama (JP)

(72) Inventor: Hideki Takehara, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/210,629

(22) Filed: Mar. 24, 2021

(65) Prior Publication Data

US 2021/0211648 A1     Jul. 8, 2021

Related U.S. Application Data

(63) Continuation of application No. PCT/JP2019/048855, filed on Dec. 13, 2019.

(30) Foreign Application Priority Data

Dec. 13, 2018  (JP) ............................. JP2018-233432
Sep. 20, 2019  (JP) ............................. JP2019-171782

(51) Int. Cl.
*H04N 19/105* (2014.01)
*H04N 19/137* (2014.01)
(Continued)

(52) U.S. Cl.
CPC ......... *H04N 19/105* (2014.11); *H04N 19/137* (2014.11); *H04N 19/176* (2014.11); *H04N 19/30* (2014.11)

(58) Field of Classification Search
CPC .............. H04N 19/105; H04N 19/137; H04N 19/176; H04N 19/30
See application file for complete search history.

(56) References Cited

U.S. PATENT DOCUMENTS

| 11,259,044 B2* | 2/2022 | Jeong ................... H04N 19/176 |
| 2014/0016701 A1* | 1/2014 | Chen .................... H04N 19/172 |
| | | 375/240.14 |

(Continued)

FOREIGN PATENT DOCUMENTS

| JP | H10-276439 A | 10/1998 |
| JP | 2013-236367 A | 11/2013 |

(Continued)

OTHER PUBLICATIONS

International Search Report from International Application No. PCT/JP2019/048855 dated Feb. 18, 2020, 4 pages.

(Continued)

*Primary Examiner* — Jae N Noh
(74) *Attorney, Agent, or Firm* — Brundidge & Stanger, P.C.

(57) ABSTRACT

A merge candidate list is generated, a merge candidate is selected from the merge candidate list as a merge candidate, a bitstream is decoded to derive a motion vector difference, and a corrected merge candidate is derived by adding the motion vector difference to a motion vector of the selected merge candidate for a first prediction without scaling and subtracting the motion vector difference from a motion vector of the selected merge candidate for a second prediction without scaling.

6 Claims, 18 Drawing Sheets

(51) Int. Cl.
*H04N 19/176* (2014.01)
*H04N 19/30* (2014.01)

(56) References Cited

U.S. PATENT DOCUMENTS

| | | | |
|---|---|---|---|
| 2014/0105302 A1 | 4/2014 | Takehara et al. | |
| 2016/0014432 A1 | 1/2016 | Park et al. | |
| 2017/0078699 A1 | 3/2017 | Park et al. | |
| 2020/0366902 A1* | 11/2020 | Jeong | H04N 19/521 |
| 2022/0109870 A1* | 4/2022 | Jeong | H04N 19/573 |

FOREIGN PATENT DOCUMENTS

| | | |
|---|---|---|
| JP | 2015-525547 A | 9/2015 |
| WO | 2018/121506 A1 | 7/2018 |

OTHER PUBLICATIONS

Bross, et al., Versatile Video Coding (Draft 3), Joint Video Expert (JVET) of ITU-T SG 16 WP 3 and ISO/IEC JTC 1/SC 29/WG 11, 12th Meeting: Macao, CN, Oct. 3-12, 2018, 4 pages.
International Preliminary Examination Report on Patentability (II) and Written Opinion from International Application No. PCT/JP2019/048855 dated Dec. 7, 2020, 9 pages.
Jeong, et al., Proposed WD for CE4 Ultimate Motion Vector Expression (Test) (4.5.4), Joint Video Expert (JVET) of ITU-T SG 16 WP 3 and ISO/IEC JTC 1/SC 29/WG 11, 12th Meeting: Macao, CN,Oct. 3-12, 2018, 12 pages.
Office Action issued for corresponding Canadian Patent Application No. 3,119,641 dated Aug. 3, 2022, 6 pages.
B. Choi, et al., "CE4: Bilinear Motion Vector Prediction (Test 4.5.2., Test 4.5.3.)", Joint Video Experts Team (JVET) of ITU-T SG 16 WP 3 and ISO/IEC JTC 1/SC 29/WG 11, 12th Meeting: Macao, CN, Oct. 3-12, 2018, Doc. # JVET-L0298-v2, 6 pages.
H. Chen, et al., "CE4: Symmetrical Mode For Bi-Prediction (Test 3.2)", Joint Video Experts Team (JVET) of ITU-T SG 16 WP 3 and ISO/IEC JTC 1/SC 29/WG 11, 11th Meeting: Ljubljana, SI, Jul. 10-18, 2018, Doc. #JVET-K0188-v2, 2 pages.
H. Chen, et al., "CE4: Symmetrical MVD Mode (Test 4.5.1)", Joint Video Experts Team (JVET) of ITU-T SG 16 WP 3 and ISO/IEC JTC 1/SC 29/WG 11, 12th Meeting: Macao, CN, Oct. 3-12, 2018, Doc. # JVET-L0370-vI, 4 pages.
J. Chen, et al. "Algorithm Description for Versatile Video Coding and Test Model 7 (VTM 7)", Joint Video Experts Team (JVET) of ITU-T SG 16 WP 3 and ISO/IEC JTC 1/SC 29/WG 11, 16th Meeting: Geneva, CH, Oct. 1-11, 2019, Doc. # JVET-P2002-v1, 90 pages.
Extended European Search Report from EP Patent Application No. 19896609.5 dated Mar. 23, 2022, 15 pages.

\* cited by examiner

FIG.8

```
coding_unit() {
...
if( MODE_INTER ) {
        if( cu_skip_flag ) {
                if( MaxNumMergeCand > 1 )
                        merge_idx
                if( cbWidth >= 8  && cbHeight >= 8 && valid_l0 || valid_l1 ) {
                        merge_mod_flag
                        if( merge_mod_flag ) {
                                if( valid_l0 )
                                        mvd_coding( 0 )
                                if( valid_l1 )
                                        mvd_coding( 1 )
                        }
                }
        } else {
                merge_flag
                if( merge_flag ) {
                        if( MaxNumMergeCand > 1 )
                                merge_idx
                        if( cbWidth >= 8  && cbHeight >= 8 && valid_l0 || valid_l1 ) {
                                merge_mod_flag
                                if( merge_mod_flag ) {
                                        if( valid_l0 )
                                                mvd_coding( 0 )
                                        if( valid_l1 )
                                                mvd_coding( 1 )
                                }
                        }
                } else {
                        ...
                }
        }
}
}
```

FIG.9

```
mvd_coding( refList ) {
        abs_mvd_greater0_flag[ 0 ]
        abs_mvd_greater0_flag[ 1 ]
        if( abs_mvd_greater0_flag[ 0 ] )
                abs_mvd_greater1_flag[ 0 ]
        if( abs_mvd_greater0_flag[ 1 ] )
                abs_mvd_greater1_flag[ 1 ]
        if( abs_mvd_greater0_flag[ 0 ] ) {
                if( abs_mvd_greater1_flag[ 0 ] )
                        abs_mvd_minus2[ 0 ]
                mvd_sign_flag[ 0 ]
        }
        if( abs_mvd_greater0_flag[ 1 ] ) {
                if( abs_mvd_greater1_flag[ 1 ] )
                        abs_mvd_minus2[ 1 ]
                mvd_sign_flag[ 1 ]
        }
}
```

FIG.10

```
mvd_coding( refList ) {
        abs_mvd_greater1_flag[ 0 ]
        abs_mvd_greater1_flag[ 1 ]
        if( abs_mvd_greater1_flag[ 0 ] )
                abs_mvd_greater2_flag[ 0 ]
        if( abs_mvd_greater1_flag[ 1 ] )
                abs_mvd_greater2_flag[ 1 ]
        if( abs_mvd_greater1_flag[ 0 ] ) {
                if( abs_mvd_greater2_flag[ 0 ] )
                        abs_mvd_minus3[ 0 ]
        }
        if( abs_mvd_greater1_flag[ 1 ] ) {
                if( abs_mvd_greater2_flag[ 1 ] )
                        abs_mvd_minus3[ 1 ]
        }
        mvd_sign_flag[ 0 ]
        mvd_sign_flag[ 1 ]
}
```

FIG.11

```
coding_unit() {
  ...
  if( MODE_INTER ) {
        if( cu_skip_flag ) {
              if( MaxNumMergeCand > 1 )
                    merge_idx
              if( cbWidth >= 8 && cbHeight >= 8 && valid_l0 && valid_l1 ) {
                    merge_mod_flag
                    if( merge_mod_flag ) {
                          mvd_coding( 0 )
                          mvd_coding( 1 )
                    }
              }
        } else {
              merge_flag
              if( merge_flag ) {
                    if( MaxNumMergeCand > 1 )
                          merge_idx
                    if( cbWidth >= 8 && cbHeight >= 8 && valid_l0 && valid_l1 ) {
                          merge_mod_flag
                          if( merge_mod_flag ) {
                                mvd_coding( 0 )
                                mvd_coding( 1 )
                          }
                    }
              } else {
                    ...
              }
        }
  }
}
```

FIG.12

```
coding_unit() {
 ...
 if( MODE_INTER ) {
        if( cu_skip_flag ) {
                if( MaxNumMergeCand > 1 )
                        merge_idx
                if( cbWidth >= 8 && cbHeight >= 8 && valid_l0 || valid_l1 ) {
                        merge_mod_flag
                        if( merge_mod_flag ) {
                                mvd_coding( 0 )
                        }
                }
        } else {
                merge_flag
                if( merge_flag ) {
                        if( MaxNumMergeCand > 1 )
                                merge_idx
                        if( cbWidth >= 8 && cbHeight >= 8 && valid_l0 || valid_l1 ) {
                                merge_mod_flag
                                if( merge_mod_flag ) {
                                        mvd_coding( 0 )
                                }
                        }
                } else {
                        ...
                }
        }
 }
}
```

FIG.14

```
coding_unit() {
  ...
  if( MODE_INTER ) {
      if( cu_skip_flag ) {
          if( MaxNumMergeCand > 1 )
              merge_idx
          if( cbWidth >= 8 && cbHeight >= 8 && !valid_l0 || !valid_l1 ) {
              merge_mod_flag
              if( merge_mod_flag ) {
                  if( !valid_l0 )
                      cmv_coding( 0 )
                  if( slice_type == B && !valid_l1 )
                      cmv_coding( 1 )
              }
          }
      } else {
          merge_flag
          if( merge_flag ) {
              if( MaxNumMergeCand > 1 )
                  merge_idx
              if( cbWidth >= 8 && cbHeight >= 8 && !valid_l0 || !valid_l1 ) {
                  merge_mod_flag
                  if( merge_mod_flag ) {
                      if( !valid_l0 )
                          cmv_coding( 0 )
                      if( slice_type == B && !valid_l1 )
                          cmv_coding( 1 )
                  }
              }
          } else {
              ...
          }
      }
  }
}
```

FIG.15

```
cmv_coding( refList ) {
        abs_cmv_greater0_flag[ 0 ]
        abs_cmv_greater0_flag[ 1 ]
        if( abs_cmv_greater0_flag[ 0 ] )
                abs_cmv_greater1_flag[ 0 ]
        if( abs_cmv_greater0_flag[ 1 ] )
                abs_cmv_greater1_flag[ 1 ]
        if( abs_cmv_greater0_flag[ 0 ] ) {
                cmv_sign_flag[ 0 ]
        }
        if( abs_cmv_greater0_flag[ 1 ] ) {
                cmv_sign_flag[ 1 ]
        }
}
```

FIG.16
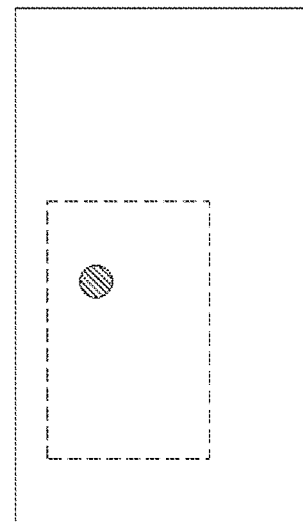
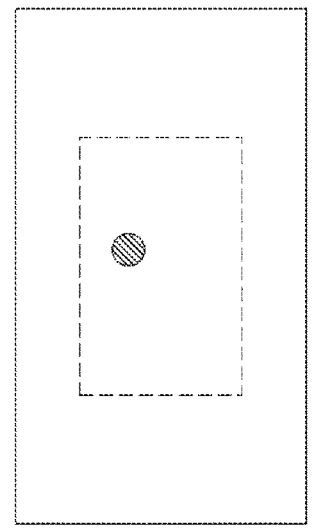
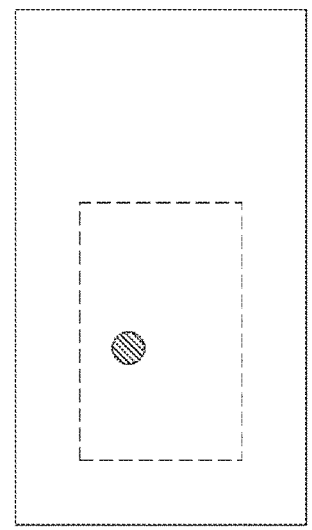

IMAGE DECODING DEVICE, IMAGE DECODING METHOD, AND IMAGE DECODING PROGRAM

BACKGROUND OF THE INVENTION

1. Field of the Invention

The present invention relates to image decoding technology.

2. Description of the Related Art

Image decoding technologies such as HEVC (H.265) are available. In HEVC, a merge mode is used as a prediction mode.
[Patent Literature 1] JP10-276439

SUMMARY OF THE INVENTION

In HEVC, a merge mode and a motion vector difference mode are available as inter prediction modes. We have realized that there is room to further improve the coding efficiency by correcting a motion vector in the merge mode.

The present invention addresses the above issue and a purpose thereof is to provide a novel inter prediction mode that offers a higher efficiency by correcting a motion vector in the merge mode.

An image decoding device according to an embodiment of the present invention includes: a merge candidate generation unit that generates a merge candidate list including, as a merge candidate, motion information on a plurality of blocks neighboring a block subject to prediction; a merge candidate selection unit that selects, as a selected merge candidate, a merge candidate from the merge candidate list; a bitstream decoding unit that decodes a bitstream to derive a motion vector difference; and a merge candidate correction unit that derives a corrected merge candidate by adding the motion vector difference to a motion vector of the selected merge candidate for a first prediction without scaling and subtracting the motion vector difference from a motion vector of the selected merge candidate for a second prediction without scaling.

Optional combinations of the aforementioned constituting elements, and implementations of the disclosure in the form of methods, apparatuses, systems, recording mediums, and computer programs may also be practiced as additional modes of the present invention.

According to the present invention, a novel inter prediction mode that offers a higher efficiency can be provided.

BRIEF DESCRIPTION OF THE DRAWINGS

FIG. 8 shows a part of the syntax of the block in the merge mode according to the embodiment;

FIG. 9 shows the syntax of the motion vector difference according to the first embodiment;

FIG. 10 shows the syntax of the motion vector difference according to a variation of the first embodiment;

FIG. 11 shows a part of the syntax of the block in the merge mode according to another variation of the first embodiment;

FIG. 12 shows a part of the syntax of the block in the merge mode according to still another variation of the first embodiment;

FIG. 14 shows a part of the syntax of the block in the merge mode according to the second embodiment;

FIG. 15 shows the syntax of the motion vector difference according to the second embodiment;

FIG. 16 is a diagram for explaining the advantage of variation 8 of the first embodiment;

DETAILED DESCRIPTION OF THE INVENTION

First Embodiment

A description will be given below of the detail of an image coding device, an image coding method, an image coding program, an image decoding device, an image decoding method, and an image decoding program according to the first embodiment of the present invention with reference to the drawings.

Figure 1A:
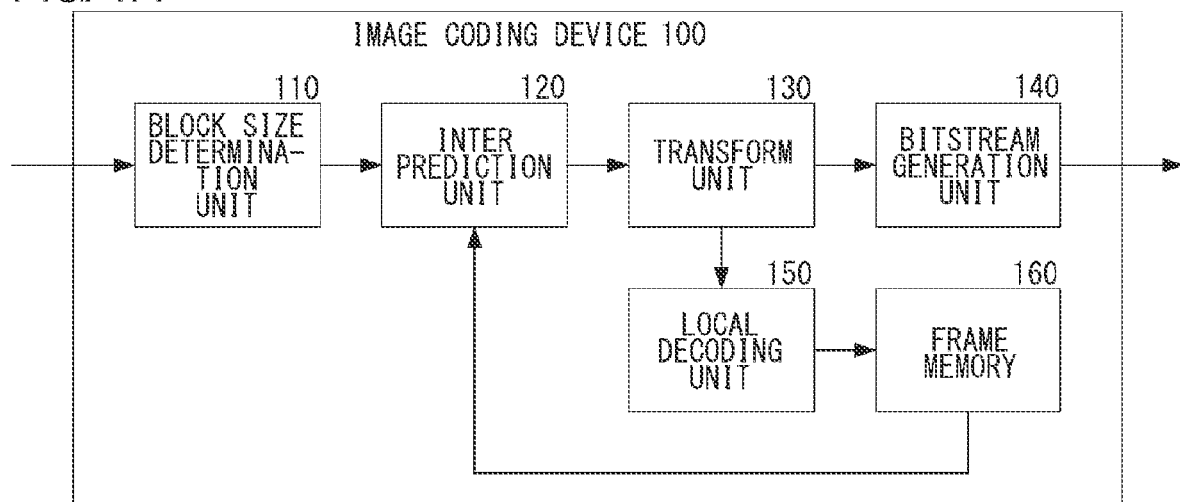
FIG. 1A is a diagram for explaining the configuration of an image coding device 100 according to the first embodiment.
Figure 1B:
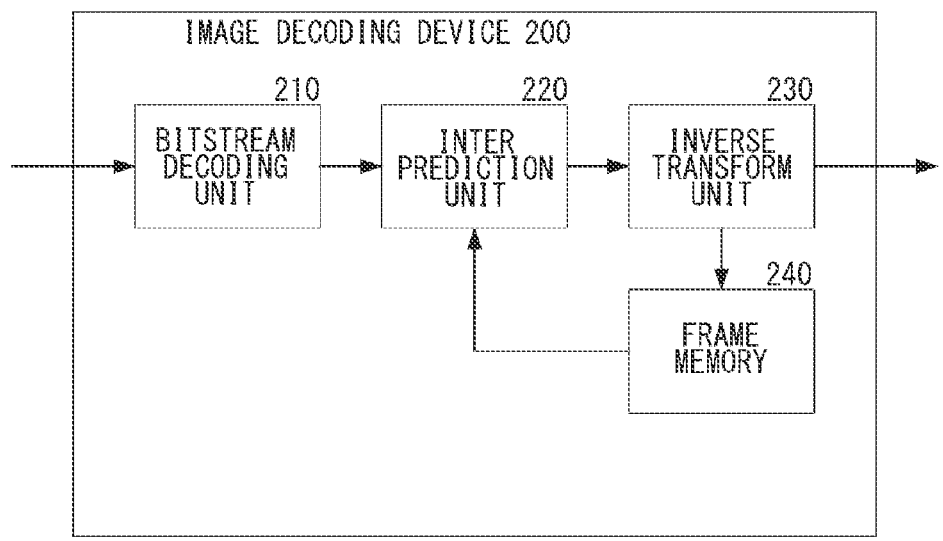
FIG. 1B is a diagram for explaining the configuration of an image decoding device 200 according to the first embodiment.

FIG. 1A is a diagram for explaining the configuration of an image coding device 100 according to the first embodiment, and FIG. 1B is a diagram for explaining the configuration of an image decoding device 200 according to the first embodiment.

The image coding device 100 according to the embodiment includes a block size determination unit 110, an inter prediction unit 120, a transform unit 130, a bitstream generation unit 140, a local decoding unit 150, and a frame memory 160. The image coding device 100 receives an input of an input image, performs intra prediction and inter prediction, and outputs a bitstream. Hereafter, an image and a picture are used as meaning the same thing.

The image decoding device 200 includes a bitstream decoding unit 210, an inter prediction unit 220, an inverse transform unit 230, and a frame memory 240. The image decoding device 200 receives an input of the bitstream output by the image coding device 100, performs intra prediction and inter prediction, and outputs a decoded image.

The image coding device 100 and the image decoding device 200 are implemented by hardware such as an information processing device provided with a central processing unit (CPU), a memory, etc.

A description will first be given of the function and operation of the parts of the image coding device 100. It is assumed that intra prediction is performed as defined in HEVC, and a description will be given below of inter prediction.

The block size determination unit 110 determines the block size subject to inter prediction, based on the input image. The block size determination unit 110 supplies the determined block size, block position, and input pixel (input value) corresponding to the block size to the inter prediction unit 120. For determination of the block size, rate distortion optimization (RDO) used in HEVC reference software, etc. is used.

Figure 2:
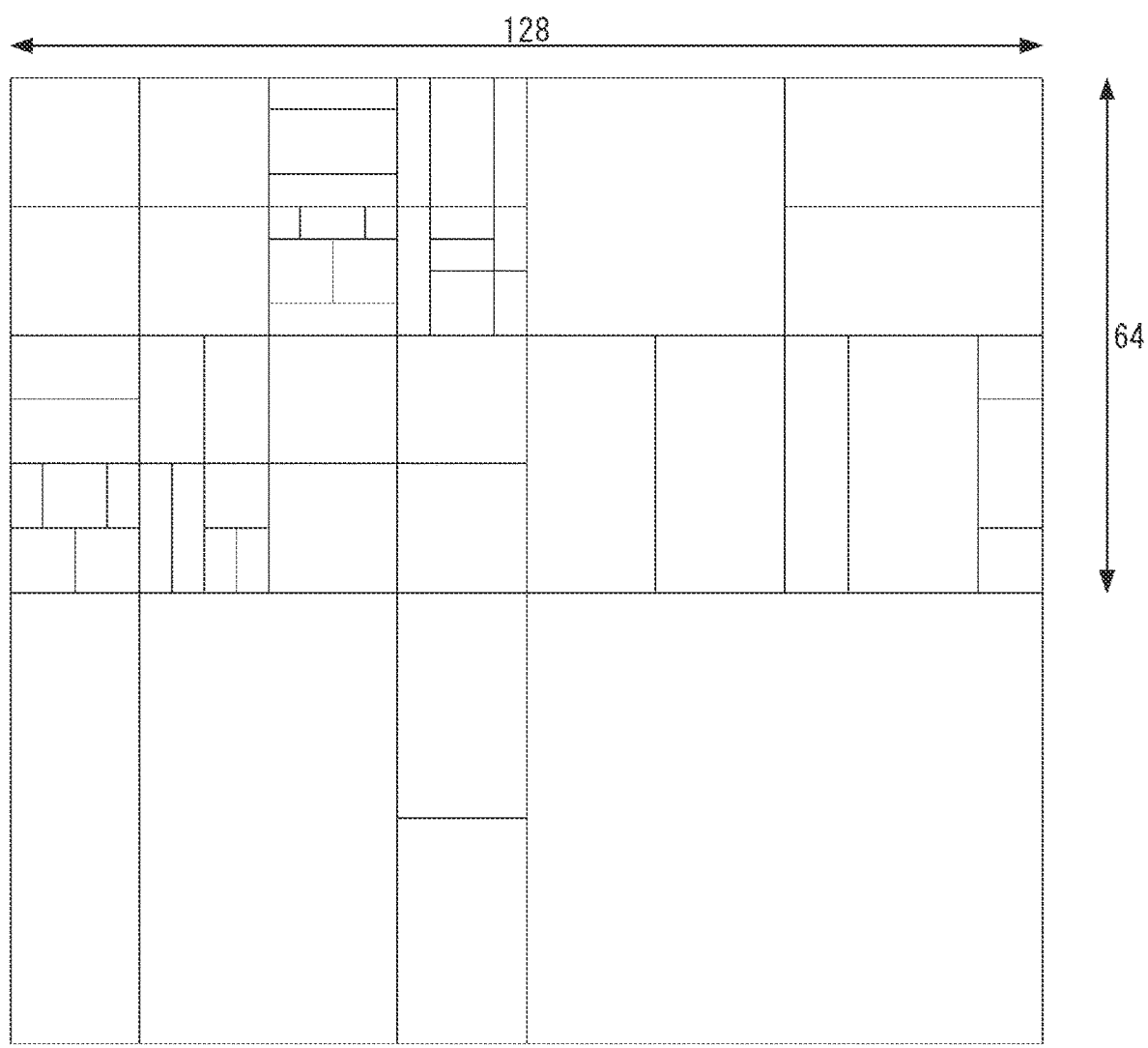
FIG. 2 shows an example in which an input image is partitioned into blocks based on the block size.

A description will be given of a block size. FIG. 2 shows an example in which a partial area in an image input to the image coding device 100 is partitioned into blocks based on the block size determined by the block size determination unit 110. Block sizes of 4×4, 8×4, 4×8, 8×8, 16×8, 8×16, 32×32, . . . , 128×64, 64×128, and 128×128 are available. The input image is partitioned by using these block size(s) such that the blocks do not overlap.

The inter prediction unit 120 uses the information input from the block size determination unit 110 and the reference picture input from the frame memory 160 to determine an inter prediction parameter used in inter prediction. The inter prediction unit 120 performs inter prediction based on the inter prediction parameter to derive a prediction value. The inter prediction unit 120 supplies the block size, block position, input value, inter prediction parameter, and prediction value to the transform unit 130. For determination of the inter prediction parameter, rate distortion optimization (RDO) used in HEVC reference software, etc. is used. The detail of the inter prediction parameter and the operation of the inter prediction unit 120 will be described later.

The transform unit 130 calculates a difference value by subtracting the prediction value from the input value, calculates prediction error data by subjecting the calculated difference value to orthogonal transform, quantization, etc. The transform unit 130 supplies the block size, block position, inter prediction parameter, the prediction error data to the bitstream generation unit 140 and the local decoding unit 150.

The bitstream generation unit 140 codes Sequence Parameter Set (SPS), Picture Parameter Set (PPS), or other information as necessary. The bitstream generation unit 140 codes the bitstream supplied from the transform unit 130 for determination of the block size, codes the inter prediction parameter in the bitstream, codes the prediction error data in the bitstream, and outputs the bitstream. The detail of the coding of the inter prediction parameter will be described later.

The local decoding unit 150 restores the difference value by subjecting the prediction error data to inverse orthogonal transform, inverse quantization, etc. The local decoding unit 150 adds the difference value and the prediction value to generate a decoded image and supplies the decoded image and the inter prediction parameter to the frame memory 160.

The frame memory 160 stores a plurality of decoded images and inter prediction parameters for the plurality of images. The frame memory 160 supplies the decoded images and the inter prediction parameters to the inter prediction unit 120.

A description will then be given of the function and operation of the parts of the image decoding device 200. It is assumed that intra prediction is performed as defined in HEVC, and a description will be given below of inter prediction.

The bitstream decoding unit 210 decodes SPS, PPS, or other information from the bitstream as necessary. The bitstream decoding unit 210 decodes the block size, block position, inter prediction parameter, and prediction error data from the bitstream. The bitstream decoding unit 210 supplies the block size, block position, inter prediction parameter, and prediction error data to the inter prediction unit 220.

The inter prediction unit 220 uses the information input from the bitstream decoding unit 210 and the reference picture input from the frame memory 240 and performs inter prediction to derive a prediction value. The inter prediction unit 220 supplies the block size, block position, inter prediction parameter, prediction error data, and prediction value to the inverse transform unit 230.

The inverse transform unit 230 calculates a difference value by subjecting the prediction error data supplied from the inter prediction unit 220 to inverse orthogonal transform, inverse quantization, etc. The inverse transform unit 230 adds the difference value and the prediction value to generate a decoded image. The inverse transform unit 230 supplies the decoded image and the inter prediction parameter to the frame memory 240 and outputs the decoded image.

The frame memory 240 stores a plurality of decoded images and inter prediction parameters for the plurality of images. The frame memory 240 supplies the decoded images and the inter prediction parameters to the inter prediction unit 220.

The inter prediction performed in the inter prediction unit 120 and that of the inter prediction unit 220 are the same. The decoded images and the inter prediction parameters stored in the frame memory 160 and those of the frame memory 240 are also the same.

A description will now be given of the inter prediction parameter. The inter prediction parameter includes a merge flag, a merge index, an availability flag for LX prediction, a motion vector for LX prediction, a reference picture index for LX prediction, a merge correction flag, and a motion vector difference for LX prediction. LX is L0 or L1. The merge flag is a flag indicating which of the merge mode and the motion vector difference mode is used as the inter prediction mode. When the merge flag is 1, the merge mode is used. When the merge flag is 0, the motion vector difference mode is used. The merge index is an index indicating the position of a selected merge candidate in the merge candidate list. The availability flag for LX prediction is a flag indicating whether LX prediction is available or unavailable. When both L0 prediction and L1 prediction are available, bidirectional prediction is indicated. When L0 prediction is available and L1 prediction is unavailable, L0 prediction is indicated. When L1 prediction is available and L0 prediction is unavailable, L1 prediction is indicated. The merge correction flag is a flag indicating whether to correct motion information of the merge candidate. When the merge correction flag is 1, the merge candidate is corrected. When the merge correction flag is 0, the merge candidate is not corrected. It should be noted here that the bitstream generation unit 140 does not code the availability flag for LX prediction in the bitstream. Further, the bitstream decoding unit 210 does not decode the availability flag for LX prediction from the bitstream. The reference picture index is an index for identifying a decoded image in the frame memory 160. Further, a combination of the availability flag for L0 prediction, the availability flag for L1 prediction, the motion vector for L0 prediction, the motion vector for L1 prediction, the reference picture index for L0 prediction, and the reference picture index for L1 prediction will be defined as motion information.

When the block is in the intra coding mode or is outside the region of the image, both the availability for L0 prediction and the availability flag for L1 prediction are configured to indicate "unavailable".

Hereinafter, the picture type of a B picture, for which all of unidirectional L0 prediction, unidirectional L1 prediction, and bidirectional prediction are available, is described by way of example. However, the picture type may be a P picture, for which only unidirectional prediction is available. The inter prediction parameter for a P picture covers only L0 prediction and is processed such that L1 prediction is not available. The coding efficiency of B pictures is generally improved when the reference picture for L0 prediction is a picture in the past relative to the picture subject to prediction, and the reference picture for L1 prediction is a picture in the future relative to the picture subject to prediction. This is because interpolative prediction improves the coding efficiency when the reference picture for L0 prediction and the reference picture for L1 prediction are located in opposite directions as viewed from the picture subject to prediction. Whether the reference picture for L0 prediction and the reference picture for L1 prediction are located in opposite directions as viewed from the picture subject to prediction can be determined by comparing the Picture Order Counts (POC) of the reference pictures. In the following description, it is assumed that the reference picture for L0 prediction and the reference picture for L1 prediction are temporally located in opposite directions as viewed from the picture subject to prediction.

A description will now be given of the detail of the inter prediction unit 120. Unless otherwise specified, the configuration and operation of the inter prediction unit 120 of the image coding device and those of the inter prediction unit 220 of the image decoding device 200 are the same.

Figure 3:
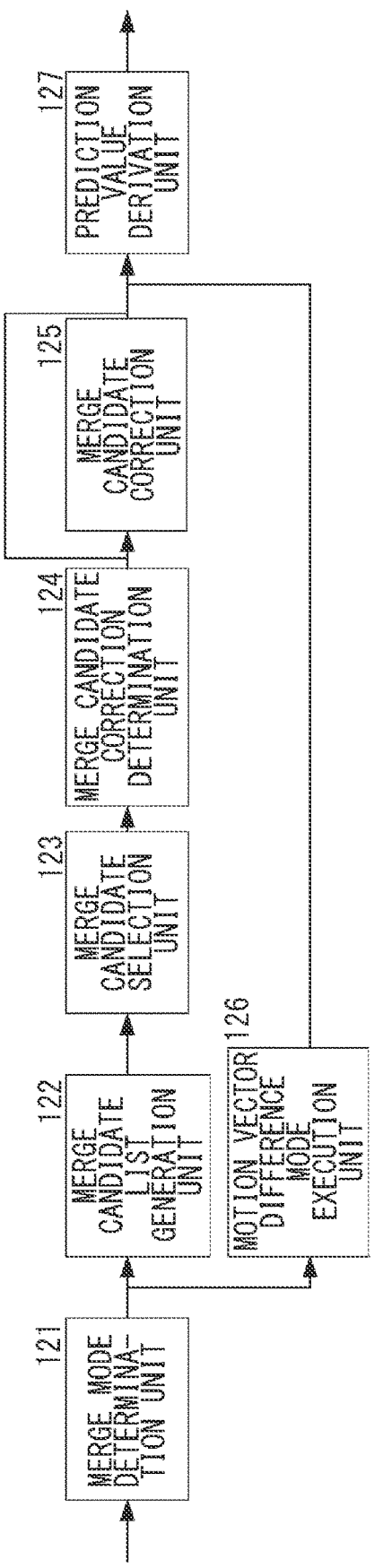
FIG. 3 is a diagram for explaining the configuration of the inter prediction unit of the image coding device of FIG. 1A.

FIG. 3 is a diagram for explaining the configuration of the inter prediction unit 120. The inter prediction unit 120 includes a merge mode determination unit 121, a merge candidate list generation unit 122, a merge candidate selection unit 123, a merge candidate correction determination unit 124, a merge candidate correction unit 125 a motion vector difference mode execution unit 126, and a prediction value derivation unit 127.

The inter prediction unit 120 switches the inter prediction mode for each block by switching between the merge mode and the motion vector difference mode. The motion difference vector mode executed in the motion vector difference mode execution unit 126 is assumed to be executed as defined in HEVC, and a description will mainly be given below of the merge mode.

The merge mode determination unit 121 determines for each block whether the merge mode is used as the inter prediction mode. When the merge flag is 1, the merge mode is used. When the merge flag is 0, the motion vector difference mode is used.

For determination as to whether the merge flag is set to 1 in the inter prediction unit 120, rate distortion optimization (RDO) used in HEVC reference software, etc. is used. The inter prediction unit 220 acquires the merge flat decoded by the bitstream decoding unit 210 from the bitstream based on the syntax. The detail of the syntax will be described later.

When the merge flag is 0, the motion vector difference mode execution unit 126 executes the motion vector difference mode, and the inter prediction parameter in the motion vector difference mode is supplied to the prediction value derivation unit 127.

When the merge flag is 1, the merge mode is executed in the merge candidate list generation unit 122, the merge candidate selection unit 123, the merge candidate correction determination unit 124, and the merge candidate correction unit 125. The inter prediction parameter in the merge mode is supplied to the prediction value derivation unit 127.

The process performed when the merge flag is 1 will be described in detail below.

Figure 4:
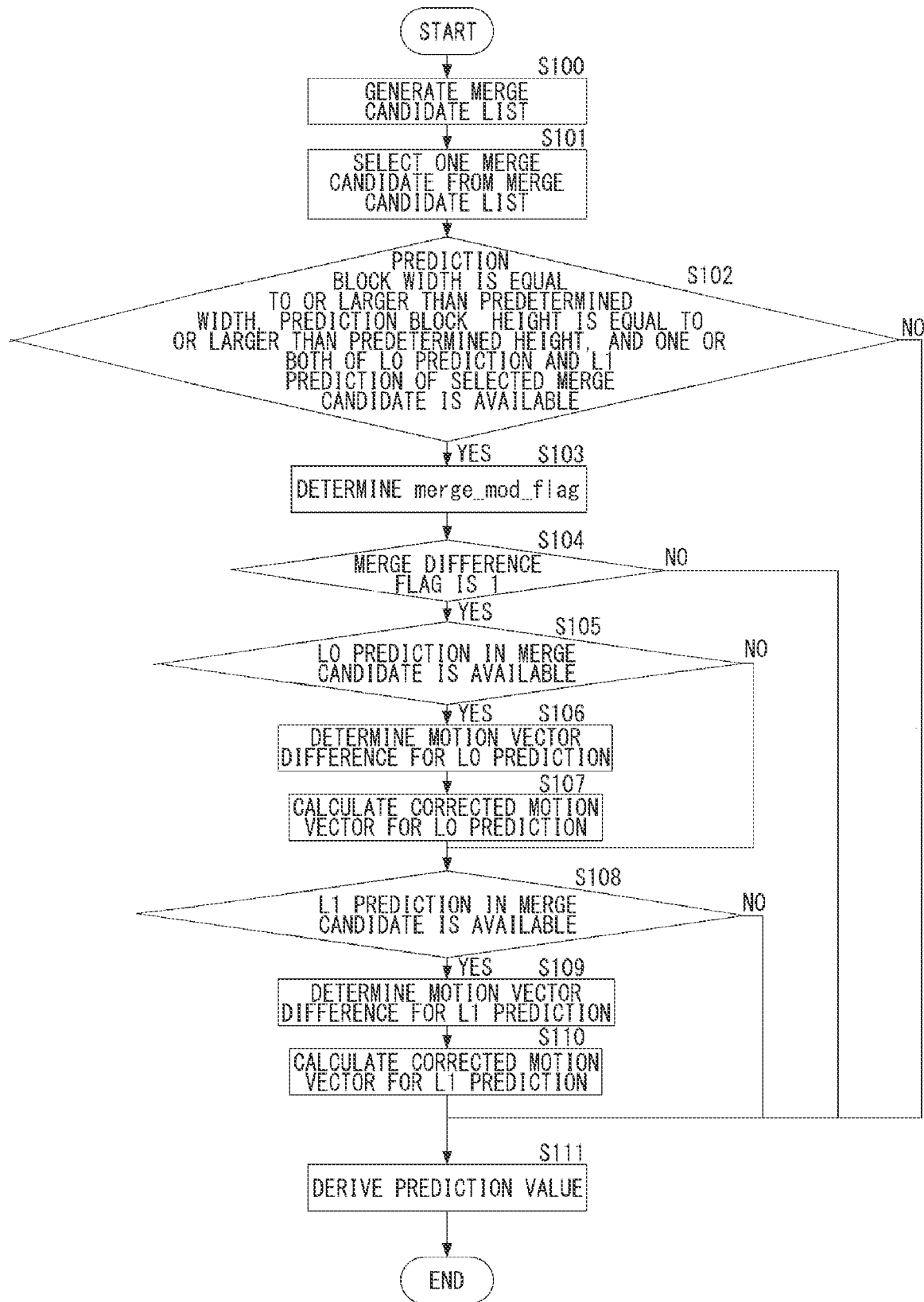
FIG. 4 is a flowchart for explaining the operation in the merge mode according to the first embodiment.

FIG. 4 is a flowchart for explaining the operation in the merge mode. The merge mode will be described in detail below with reference to FIGS. 3 and 4.

First, the merge candidate list generation unit 122 generates a merge candidate list from the motion information on the block neighboring the block processed and the motion information on the block in the decoded image (S100). The merge candidate list generation unit 122 supplies the merge candidate list thus generated to the merge candidate selection unit 123. Hereinafter, the block processed and the block subject to prediction are used as meaning the same thing.

Figure 5:
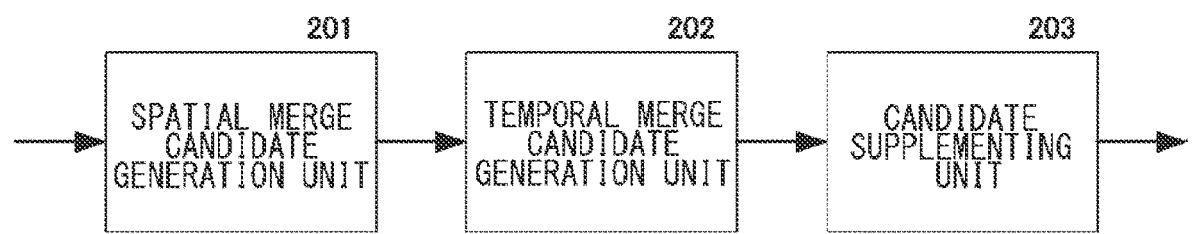
FIG. 5 is a diagram for explaining the configuration of the merge candidate list generation unit of the image coding device of FIG. 1A.

A description will now be given of generation of the merge candidate list. FIG. 5 is a diagram for explaining the configuration of the merge candidate list generation unit 122. The merge candidate list generation unit 122 includes a spatial merge candidate generation unit 201, a temporal merge candidate generation unit 202, and a merge candidate supplementing unit 203.

Figure 6:
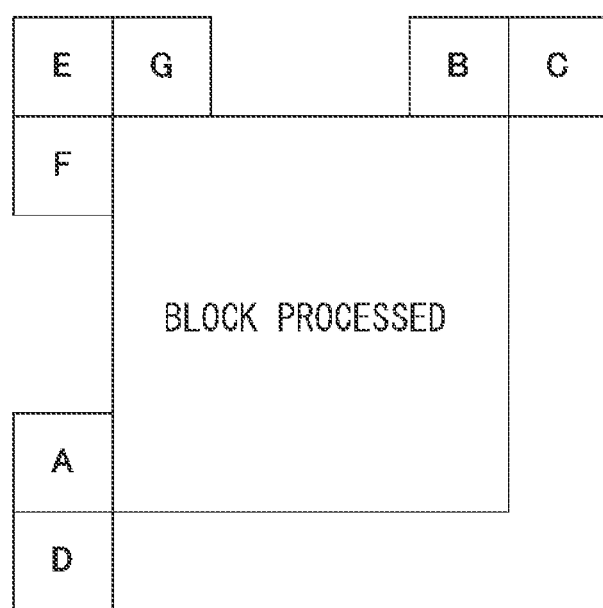
FIG. 6 is a diagram for explaining blocks neighboring the block processed.

FIG. 6 is a diagram for explaining blocks neighboring the block processed. A block A, a block B, a block C, a block D, a block E, a block F, and a block G are defined as blocks neighboring the block processed. However, the embodiment is non-limiting so long as a plurality of blocks neighboring the block processed are used.

Figure 7:
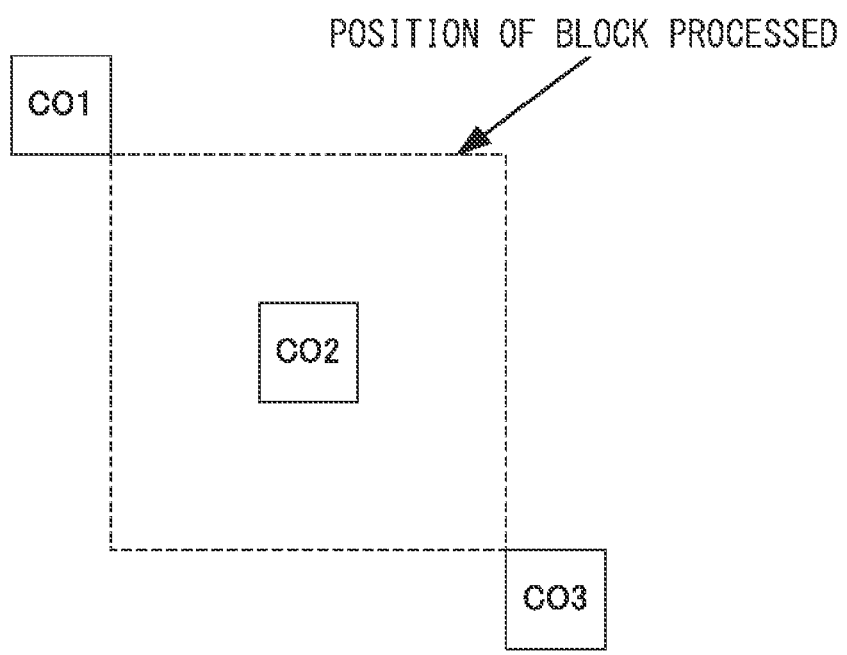
FIG. 7 is a diagram for explaining blocks on the decoded image located at the same position as or around the block processed.

FIG. 7 is a diagram for explaining blocks on the decoded image located at the same position as or around the block processed. A block CO1, a block CO2, and a block CO3 are defined as blocks located at the same position as or around the block processed. However, the embodiment is non-limiting so long as a plurality of blocks on the decoded image located at the same position as or around the block processed are used. Hereinafter, the blocks CO1, CO2, and CO3 will be referred to as collocated blocks, and the decoded image including the collocated blocks will be referred to as the collocated picture.

Generation of the merge candidate list will be described in detail below with reference to FIGS. 5, 6, and 7.

First, the spatial merge candidate generation unit 201 examines the block A, the block B, the block C, the block D, the block E, the block F, and the block G sequentially. When one or both of the availability flag for L0 prediction and the availability flag for L1 prediction indicates "available", the motion information on the block is added to the merge candidate list sequentially. The merge candidate generated by the spatial merge candidate generation unit 201 will be referred to as a spatial merge candidate.

The temporal merge candidate generation unit 202 then examines the block CO01, the block CO2, and the block CO3 sequentially. The temporal merge candidate generation unit 202 subjects the motion information on the first block, for which one or both of the the availability flag for L0 prediction and the availability flag for L1 prediction indicates "available", to a process such as scaling and adds the block to the merge candidate list sequentially. The merge candidate generated by the temporal merge candidate generation unit 202 will be referred to as a temporal merge candidate.

A description will be given of scaling of the temporal merge candidate. Scaling of the temporal merge candidate is as defined in HEVC. The motion vector of the temporal merge candidate is derived by scaling the motion vector of the collocated block in accordance with the distance between the picture in which the block processed is located and the picture referred to by the temporal merge candidate relative to the distance between the collocated picture and the reference picture referred to by the collocated picture.

The picture referred to by the temporal merge candidate is a reference picture for which the reference picture indices for L0 prediction and L1 prediction are both 0. Whether the collocated block for L0 prediction or the collocated block for L1 prediction is used as the collocated block is determined by coding (decoding) a colocation derivation flag. As described above, one of the motion vector for L0 prediction and the motion vector for L1 prediction of the collocated block is scaled for L0 prediction or L1 prediction, thereby deriving a new motion vector for L0 prediction or a new motion vector for L1 prediction. The new motion vector for L0 prediction or the new motion vector for L1 prediction is defined as a motion vector for the temporal merge candidate.

When it is then found that a plurality of items of the same motion information are included in the merge candidate list, one motion information item is allowed to remain, and the other items of motion information are deleted.

When it is then found that the number of merge candidates included in the merge candidate list is fewer than the maximum number of merge candidates, the merge candidate supplementing unit 203 adds supplementary merge candidates to the merge candidate list until the number of merge candidates included in the merge candidate list reaches the maximum number of merge candidates to make the number of merge candidates included in the merge candidate list equal to the maximum number of candidates. The supplementary merge candidate is motion information in which the motion vectors for L0 prediction and L1 prediction are both (0,0), and the reference picture indices for L0 prediction and L1 prediction are both 0.

The maximum number of merge candidates is assumed to be 6 here but may be 1 or larger.

The merge candidate selection unit 123 then selects one merge candidate from the merge candidate list (S101). The merge candidate selection unit 123 supplies the merge candidate thus selected (referred to as "selected merge candidate") and the merge index to the merge candidate correction determination unit 124. The merge candidate selection unit 123 defines the selected merge candidate as the motion information on the block processed. The inter prediction unit 120 of the image coding device 100 uses rate distortion optimization (RDO) used in HEVC reference software, etc. to select one merge candidate from the merge candidates included in the merge candidate list and determine the merge index. The inter prediction unit 220 of the image decoding device 200 acquires the merge index decoded by the bitstream decoding unit 210 from the bitstream and selects one merge candidate from the merge candidates included in the merge candidate list, based on the merge index.

The merge candidate correction determination unit 124 then examines whether the width of the block processed is equal to or larger than a predetermined width, the height of the block processed is equal to or larger than a predetermined height, and both or at least one of L0 prediction and L1 prediction of the selected merge candidate is available (S102). If it is not satisfied that the width of the block processed is equal to or larger than the predetermined width, the height of the block processed is equal to or larger than the predetermined height, and both or at least one of L0 prediction and L1 prediction of the selected merge candidate is available (NO in S102), the selected merge candidate is not corrected as the motion the block processed, and control proceeds to step S111. The merge candidate list will include a merge candidate in which which at least one of L0 prediction and L1 prediction is available without exception. It is therefore obvious that both or at least one of L0 prediction and L1 prediction of the selected merge candidate is available. Thus, the step of determining "whether both or at least one of L0 prediction and L1 prediction of the selected merge candidate is available" in S102 may be omitted, and S102 may examine whether the width of the block processed is equal to or larger than the predetermined width and whether the height of the block processed is equal to or larger than the predetermined height.

When the width of the block processed is equal to or larger than the predetermined width, the height of the block processed is equal to or larger than the predetermined height, and both or at least one of L0 prediction and L1 prediction of the selected merge candidate is available (YES in S102), the merge candidate correction determination unit 124 sets a merge correction flag (S103) and supplies the merge correction flag to the merge candidate correction unit 125. The inter prediction unit 120 of the image coding device 100 sets the merge correction flag to 1 when the prediction error that results when inter prediction is performed by using the merge candidate is equal to larger than a predetermined prediction error. When the prediction error that results when inter prediction is performed by using the selected merge candidate is not equal to or larger than the predetermined prediction error, the inter prediction unit 120 sets the merge correction flag to 0. The inter prediction unit 220 of the image decoding device 200 acquires the merge correction flag decoded by the bitstream decoding unit 210 from the bitstream based on the syntax.

The merge candidate correction unit 125 then examines whether the merge correction flag is 1 (S104). When the merge correction flag is not 1 (NO in S104), control proceeds to S111 without correcting the selected merge candidate as the motion information on the block processed.

When the merge correction flag is 1 (YES in S104), the merge candidate correction unit 215 examines whether L0 prediction of the selected merge candidate is available (S105). When L0 prediction of the selected merge candidate indicates is not available (NO in S105), control proceeds to step S108. When L0 prediction of the selected merge candidate is available (YES in S105), the motion vector difference for L0 prediction is determined (S106). As described above, the motion information of the selected merge candidate is corrected when the merge correction flag is 1. The motion information of the selected merge candidate is not corrected when the merge correction flag is 0.

The inter prediction unit 120 of the image coding device 100 determines the motion vector difference for L0 prediction through motion vector search. It is assumed here that the range searched for the motion vector is ±16 both in the horizontal direction and in the vertical direction. Alternatively, the range may be an integral multiple of 2 such as 64. The inter prediction unit 220 of the image decoding device 200 acquires the motion vector difference for L0 prediction decoded by the bitstream decoding unit 210 from the bitstream based on the syntax.

The merge candidate correction unit 125 then calculates a corrected motion vector for L0 prediction and defines the corrected motion vector for L0 prediction as the motion vector for L0 prediction of the motion information on the block processed (S107).

A description will now be given of the relationship between the corrected motion vector for L0 prediction (mvL0), the motion vector for L0 prediction of the selected merge candidate (mmvL0), and the motion vector difference for L1 prediction (mvdL0). The corrected motion vector for L0 prediction (mvL0) is derived by adding the motion vector for L0 prediction of the selected merge candidate (mmvL0) and the motion vector difference for L0 prediction (mvdL0) and is given by the following expression, where [0] denotes the horizontal component of the motion vector, and [1] denotes the vertical component of the motion vector.

mvL0 [0]=mmvL0 [0]+mvdL0 [0]
mvL0[1]=mmvL0[1]+mvdL0[1]

Whether L1 prediction of the selected merge candidate is available is then examined (S108). When L1 prediction of the selected merge candidate is not available (NO in S108), control proceeds to step S111. When L1 prediction of the selected merge candidate is available (YES in S108), the motion vector difference for L1 prediction is determined (S109).

The inter prediction unit 120 of the image coding device 100 determines the motion vector difference for L1 prediction through motion vector search. It is assumed here that the range searched for the motion vector is ±16 both in the horizontal direction and in the vertical direction.

Alternatively, the range may be an integral multiple of 2 such as±64. The inter prediction unit 220 of the image decoding device 200 acquires the motion vector difference for L1 prediction decoded by the bitstream decoding unit 210 from the bitstream based on the syntax.

The merge candidate correction unit 125 then calculates a corrected motion vector for L1 prediction and defines the corrected motion vector for L1 prediction as the motion vector for L1 prediction of the motion information on the block processed (S110).

A description will now be given of the relationship between the corrected motion vector for L1 prediction (mvL1), the motion vector for L1 prediction of the selected merge candidate (mmvL1), and the motion vector difference for L1 prediction (mvdL0). The corrected motion vector for L1 prediction (mvL1) is derived by adding the motion vector for L1 prediction of the selected merge candidate (mmvL1) and the motion vector difference for L1 prediction (mvdL1) and is given by the following expression, where [0] denotes the horizontal component of the motion vector, and [1] denotes the vertical component of the motion vector.

mvL1[0]=mmvL1[0]+mvdL1[0]
mvL1[1]=mmvL1[1]+mvdL1[1]

The prediction value derivation unit 127 then performs one of L0 prediction, L1 prediction, and bidirectional prediction, based on the motion information on the block processed to derive the prediction value (S111). As described above, the motion information of the selected merge candidate is corrected when the merge correction flag is 1. The motion information of the selected merge candidate is not corrected when the merge correction flag is 0.

Coding of the inter prediction parameter will be described in detail below. FIG. 8 shows a part of the syntax of the block in the merge mode. Table 1 shows the relationship between the inter prediction parameter and the syntax. cbWidth of FIG. 8 denotes the width of the block processed, and cbheight denotes the height of the block processed. The predetermined with and the predetermined height are both defined to be 8. By not correcting the merge candidate in units of small blocks by setting the predetermined width and the predetermined height, the processing volume can be reduced. cu_skip_flag will be 1 when the block is in the skip mode and will be 0 when the block is not in the skip mode. The syntax of the skip mode is the same as the syntax of the merge mode. merge_idx is a merge index for selecting the selected merge candidate from the merge candidate list.

By coding (decoding) merge_idx before merge_mod_flag to fix the merge index and then determining the coding (decoding) of merge_mod_flag, and by sharing the merge index merge_idx with the merge mode, the coding efficiency is improved while at the same inhibiting the syntax from becoming complicated and inhibiting the context from being increased.

| Element of inter prediction parameter | Element of syntax |
| --- | --- |
| merge flag | merge_flag |
| merge index | merge_idx |
| merge correction flag | merge_mod_flag |
| motion vector difference for L0 prediction | mvd_coding(0) |
| motion vector difference for L1 prediction | mvd_coding(1) |
| availability flag for L0 prediction | valid_10 |
| availability flag for L1 prediction | valid_11 |

FIG. 9 shows the syntax of the motion vector difference. mvd_coding(N) of FIG. 9 is the same syntax as the syntax used in the motion vector difference mode, where N is 0 or 1. N=0 indicates L0 prediction, and N=1 indicates L1 prediction.

The syntax of the motion vector difference includes: abs_mvd_greater0_flag[d], a flag indicating whether the component of the motion vector difference is larger than 0; abs_mvd_greater1_flag[d], a flag indicating whether the component of the motion vector difference is larger than 1; mvd_sign_flag[d] indicating the sign (±) of the motion vector difference; and abs_mvd_minus2[d] indicating the absolute value of the vector derived by subtracting 2 from the component of the motion vector difference, where d is 0 or 1. d=0 indicates a horizontal component, and d=1 indicates a vertical component.

In HEVC, the merge mode and the motion vector difference mode are available as inter prediction modes. The merge mode makes it possible to restore the motion information by using one merge flag and so offers an extremely high coding efficiency. Since the motion information in the merge mode depends on the processed block so that a high prediction efficiency is available only in limited cases, and improvement in the use efficiency has been called for.

On the other hand, the motion vector difference mode requires preparing the syntax for L0 prediction and the syntax for L1 prediction separately. The motion vector difference mode also requires the prediction type (L0 prediction, L1 prediction, or bidirectional prediction) and the motion vector predictor flag, the motion vector difference, and the reference picture index for L0 prediction and L1 prediction, respectively. Therefore, the motion vector difference mode is a mode that does not offer a better coding efficiency than the merge mode but offers a stable and high prediction efficiency for abrupt motion that has little correlation to the motion of a spatially neighboring block or a temporally neighboring block, which cannot be derived in the merge mode.

According to the embodiment, the coding efficiency can be improved from that of the motion vector difference mode and the use efficiency can be improved from that of the merge mode, by making it possible to correct the motion vector in the merge mode while maintaining the prediction type and the reference picture index of the merge mode fixed.

Also, the motion vector difference is restricted to a small magnitude and the coding efficiency is improved by defining the motion vector difference to be a difference from the motion vector of the selected merge candidate.

Further, configuring the syntax of the motion vector difference in the merge mode to be the same as the syntax of the motion vector difference in the motion vector difference mode requires only a small change in the configuration even if the motion vector difference is introduced in the merge mode.

Further, the processing volume required to correct the motion vector in the merge mode can be suppressed by defining the predetermined width and the predetermined height, and by skipping the process of correcting the motion vector in the merge mode unless it is satisfied that the prediction block width is equal to or larger than the predetermined with, the prediction block height is equal to larger than the predetermined height, and both or at least one of L0 prediction or L1 prediction of the selected merge candidate is available. It should be noted that there is no need to restrict the correction of the motion vector according to the predetermined width and the predetermined height if it is not necessary to suppress the processing volume for correcting the motion vector.

A description will now be given of the variations of the embodiment. Unless otherwise specified, the variations can be combined with each other.

[Variation 1]

In the embodiment, the motion vector difference is used as the syntax of the block in the merge mode. In this variation, the motion vector difference is defined to be coded (decoded) as a unit motion vector difference. A unit motion vector difference is a motion vector that results when the picture interval is the minimum interval. In HEVC, etc. the minimum picture interval is coded in the bitstream.

The unit motion vector difference is scaled in accordance with the interval between the picture coded and the reference picture in the merge mode, and the scaled vector is used as the motion vector difference. Denoting the Picture Order Count (POC) of the picture coded as POC(Cur), the POC of the reference picture for L0 prediction in the merge mode as POC(L0), and the POC of the reference picture for L1 prediction in the merge mode as POC(L1), the motion vector is calculated as follows, where umvdL0 denotes the unit motion vector difference for L0 prediction, and umvdL1 denotes the unit motion vector difference for L1 prediction.

mvL0[0]=mmvL0[0]+umvdL0[0]*(POC(Cur)-POC(L0))
mvL0[1]=mmvL0[1]+umvdL0[1]*(POC(Cur)-POC(L0))
mvL1[0]=mmvL1[0]+umvdL1[0]*(POC(Cur)-POC(L1))
mvL1[1]=mmvL1[1]+umvdL1[1]*(POC(Cur)-POC(L1))

According to this variation, the coding efficiency can be improved by reducing the code volume for the motion vector difference, by using the unit motion vector difference as the motion vector difference. The coding efficiency can be particularly improved in the case the motion vector difference is large and the distance between the picture subject to prediction and the reference picture is large. The prediction efficiency and the coding efficiency can also be improved in the case the interval between the picture processed and the reference picture is proportionate to the speed of an object moving in the screen.

Unlike the case of a temporal merge candidate, this variation makes scaling according to the inter-picture distance unnecessary to derive the motion vector. The decoding device only requires a multiplier for scaling so that a divider is unnecessary, and the circuit scale and the processing volume can be reduced.

[Variation 2]

In the embodiment, it is defined that the motion vector difference component of 0 can be coded (or decoded). For example, it is defined that only L0 prediction can be changed. In this variation, it is defined that the motion vector difference component of 0 cannot be coded (or decoded).

FIG. 10 shows the syntax of the motion vector difference according to variation 2. The syntax for the motion vector difference includes: abs_mvd_greater1_flag[d], a flag indicating whether the component of the motion vector difference is larger than 1; abs_mvd_greater2_flag[d], a flag indicating whether the component of the motion vector difference is larger than 2; abs_mvd_minus3[d] indicating the absolute value of the vector derived by subtracting 3 from the component of the motion vector difference; and mvd_sign_flag[d] indicating the sign (±) of the motion vector difference.

As described above, the coding efficiency in the case of the motion vector difference component of 1 or larger can be improved by not coding (or decoding) the motion vector difference component of 0.

[Variation 3]

The motion vector difference component is defined to be an integer according to the embodiment and to be an integer excluding 0 according to variation 2. In this variation, the component of the motion vector difference, excluding the±sign, is restricted to a power of 2.

abs_mvd_pow_plus1[d] is used instead of the syntax abs_mvd_minus2[d] according to the embodiment. The motion vector difference mvd[d] is calculated from mvd_sign_flag[d] and abs_mvd_pow_plus1[d] according to the following expression.

mvd[d]=mvd_sign_flag[d]*2^(abs_mvd_pow_plus1[d]+1)

Further, abs_mvd_pow_plus2[d] is used instead of the syntax abs_mvd_minus3[d] according to variation 2. The motion vector difference mvd[d] is calculated from mvd_sign_flag[d] and abs_mvd_pow_plus2[d] according to the following expression.

mvd[d]=mvd_sign_flag[d]*2^(abs_mvd_pow_plus2[d]+2)

By restricting the motion vector difference component to a power of 2, the prediction efficiency in the case of a large motion vector can be improved, while at the same time reducing the processing volume in the coding device significantly.

[Variation 4]

In the embodiment mvd_coding(N) is defined to include the motion vector difference. In this variation, mvd_coding(N) is defined to include the motion vector magnification ratio.

The syntax mvd_coding(N) according to this variation does not include abs_mvd_greater0_flag[d], abs_mvd_greater1_flag[d], or mvd_sign_flag[d] but is configured to include abs_mvr_plus2[d] and mvr_sign_flag[d] instead.

The corrected motion vector (mvLN) for LN prediction is derived by multiplying the motion vector of the selected merge candidate for LN prediction (mmvLN) and the motion vector magnification ratio (mvrLN) and is calculated according to the following expression.

mvLN[d]=mmvLN[d]*mvrLN[d]

By restricting the motion vector difference component to a power of 2, the prediction efficiency in the case of a large motion vector can be improved, while at the same time reducing the processing volume in the coding device significantly.

It should be noted that this variation cannot be combined with variation 1, variation 2, variation 3, or variation 6.

[Variation 5]

The syntax of FIG. 8 according to the embodiment indicates that merge_mod_flag is included in the case cu_skip_flag is 1 (skip mode). Alternatively, merge_mod_flag may not be included in the case of the skip mode.

By omitting merge_mod_flag in this way, the coding efficiency in the skip mode can be improved, and the determination in the skip mode is simplified.

[Variation 6]

In the embodiment, whether LN prediction (N=0 or 1) of the selected merge candidate is available is examined, and the motion vector difference is not made available when LN prediction of the selected merge candidate is not available. Alternatively, the motion vector difference may be made available regardless of whether LN prediction of the selected merge candidate is available or not without examining whether LN prediction of the selected merge candidate is available. In this case, the motion vector of the selected merge candidate for LN prediction will be (0,0), and the reference picture index of the selected merge candidate for LN prediction will be 0, provided that LN prediction of the selected merge candidate is unavailable.

Thus, according to this variation, the chance of using bidirectional prediction is increased and the coding efficiency is improved by making the motion vector difference available regardless of whether LN prediction of the selected merge candidate for LN prediction is available or not.

[Variation 7]

In the embodiment, the availability of L0 prediction and L1 prediction of the selected merge candidate is determined individually to control whether to code (decode) the motion vector difference. Alternatively, the motion vector difference may be coded (or decoded) when both L0 prediction and L1 prediction of the selected merge candidate are available and not coded (or decoded) when either L0 prediction or L1 prediction of the selected merge candidate is unavailable. In the case of this variation, step S102 will be as follows.

The merge candidate correction determination unit 124 examines whether the width of the block processed is equal to or larger than the predetermined width, the height of the block processed is equal to or larger than the predetermined height, and both L0 prediction and L1 prediction of the selected merge candidate are available (S102).

Further, step S105 and step S108 are unnecessary in this variation.

FIG. 11 shows a part of the syntax of the block in the merge mode according to variation 7. The syntax related to steps S102, S105, and S108 differs from that of the embodiment.

As described, the prediction efficiency is improved efficiently according to this variation by correcting the motion vector of the selected merge candidate for bidirectional prediction, which is frequently used, by making the motion vector difference available when both L0 prediction and L1 prediction of the selected merge candidate are available.

[Variation 8]

In the embodiment, two motion vector differences including the motion difference for L0 prediction and the motion vector difference for L1 prediction are used in the syntax of the block in the merge mode. In this variation, only one motion vector difference is coded (or decoded), and the one motion vector difference is shared to calculate, as indicated below, the motion vector mvLN(N=0,1) of the corrected merge candidate as the motion vector difference for L0 prediction and as the motion vector difference for L1 prediction, from the motion vector mmvLN(N=0,1) of the selected merge candidate and the motion vector difference mvd.

When L0 prediction of the selected merge candidate is available, the motion vector for L0 prediction is calculated according to the following expression.

mvL0[0]=mmvL0[0]+mvd[0]
mvL0[1]=mmvL0[1]+mvd[1]

When L1 prediction of the selected merge candidate is available, the motion vector for L1 prediction is calculated according to the following expression. The motion vector difference in the direction opposite to that of L0 prediction is added. The motion vector difference may be subtracted from the motion vector of the selected merge candidate for L1 prediction.

mvL1[0]=mmvL1[0]+mvd[0]*−1
mvL1[1]=mmvL1[1]+mvd[1]*−1

FIG. 12 shows a part of the syntax of the block in the merge mode according to variation 8. This variation differs from the embodiment in that examination as to the availability of L0 prediction and the availability of L1 prediction is removed, and mvd_coding(1) is not included. mvd_coding(0) represents the one motion vector difference.

As described above, the coding efficiency can be improved while at the same time inhibiting the prediction efficiency from dropping according to this variation, by defining only one motion vector difference for L0 prediction and L1, thereby reducing the number of motion vector differences to half in the case of bidirectional prediction and sharing one motion vector difference for L0 prediction and L1 prediction.

Further, the coding efficiency in the presence of a motion in a certain direction can be improved by adding, when the reference picture referred to by the selected merge candidate for L0 prediction and the reference picture referred to for L1 prediction are located in opposite directions (are not in the same direction) with respect to the picture subject to prediction, the motion vector difference in the opposite direction.

The advantage of this variation will be described in detail. FIG. 16 is a diagram for explaining the advantage of variation 8. FIG. 16 shows an image of a sphere (area filled by hatched lines) moving in the horizontal direction in a moving rectangular area (area bounded by the broken line). In this case, the motion of the sphere relative to the screen will be derived by adding the motion of the rectangular area and the motion of the sphere moving in the horizontal direction. It will be assumed that picture B is the picture subject to prediction, picture A is the reference picture for L0 prediction, and picture C is the reference picture for L1 prediction. Picture A and picture B are reference pictures located in opposite directions with respect to the picture subject to prediction.

In the case the sphere moves in a constant direction at a constant speed, the motion of the sphere can be accurately reproduced by adding the amount of motion of the sphere that cannot be acquired from adjacent blocks to L0 prediction and subtracting the amount from L1 prediction, provided that picture A, picture B, and picture C are at equal intervals.

When the sphere moves in a constant direction at a speed that is not constant, the motion of the sphere can be accurately reproduced by adding the amount of motion of the sphere that cannot be acquired from adjacent blocks to L0 prediction and subtracting the amount from L1 prediction, provided that picture A, picture B, and picture C are not at equal intervals but the amounts of motion of the sphere relative to the rectangular area are at equal intervals.

Figure 17:
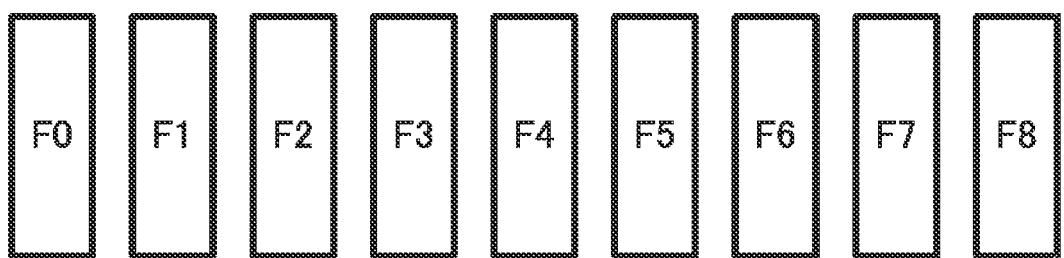
FIG. 17 is a diagram for explaining the advantage provided in the case the picture intervals of variation 8 according to the first embodiment are not constant.

Further, when the sphere moves in a constant direction at a constant speed during a certain period, picture A, picture B, and picture C may not be at equal intervals, but the amounts of motion of the sphere relative to the rectangular area may be at equal intervals. FIG. 17 is a diagram for explaining the advantage achieved in the case the picture intervals of variation 8 are not constant. A detailed description of this case will be given with reference to FIG. 17. Pictures F0, F1, . . . , F8 of FIG. 17 are pictures at fixed intervals. It is assumed that, from picture F0 to picture F4, the sphere remains still and moves in a constant direction at a constant speed from picture F5 forward. Given that picture F0 and picture F6 are reference pictures and picture F5 is the picture subject to prediction, picture F0, picture F5, and picture F6 are not at equal intervals, but the amounts of motion of the sphere relative to the rectangular area are at equal intervals. Given picture F5 as the picture subject to prediction, the closest picture F4 is generally selected as the reference picture. Picture F0 will be selected as the reference picture instead of picture F4 if picture F0 is a high-quality picture less distorted than picture F4. The reference picture is normally managed in the First-In First-Out (FIFO) scheme in the reference picture buffer. The long term reference picture is available as a scheme to allow a high-quality, less-distorted picture to remain in the reference picture buffer for a long time as a reference picture. The long-term reference picture is not managed in the FIFO scheme in the reference picture buffer. Reference picture list control information coded in the slice header manages whether to define a picture as a long-term reference picture. Thus, the prediction efficiency and the coding efficiency can be improved by applying this variation to the case in which one or both of L0 prediction and L1 prediction uses a long-term reference picture. Further, the prediction efficiency and the coding efficiency can be improved by applying this variation to the case in which an intra picture is encountered in one or both of L0 prediction and L1 prediction.

Further, the circuit scale and power consumption can be reduced by not scaling the motion vector difference based on the inter-picture distance as in the case of the temporal merge candidate. If the temporal merge candidate is selected as the selected merge candidate in the case the motion vector difference is scaled, for example, scaling of the temporal merge candidate and scaling of the motion vector and scaling of the motion vector difference will both be required. Scaling of the temporal merge candidate and scaling of the motion vector differ are based on different reference motion vectors and so cannot be performed concurrently and must be performed separately.

Further, when the temporal merge candidate is included in the merge candidate list as in the case of the embodiment, the temporal merge candidate is scaled, and the coding efficiency can be improved without scaling the motion vector difference provided that the motion vector difference is smaller than the motion vector of the temporal merge candidate. Further, the coding efficiency is inhibited from dropping by selecting the motion vector difference mode when the motion vector difference is large.

[Variation 9]

In the embodiment, it is assumed that the maximum number of merge candidates remains unchanged when the merge correction flag is 0 and when it is 1. In this variation, the maximum number of merge candidates in the case of the merge correction flag of 1 is configured to be smaller than the maximum number of merge candidates in the case of the merge correction flag of 0. For example, the maximum number of merge candidates is defined to be 2 when the merge correction flag is 1. The maximum number of merge candidates in the case of the merge correction flag of 1 will be referred to as maximum number of corrected merge candidates. When the merge index is smaller than the maximum number of corrected merge candidates, the merge correction flag is coded (decoded). When the merge index is equal to larger than the maximum number of corrected merge candidates, the merge correction flag is not coded (decoded). The maximum number of merge candidates and the maximum number of corrected merge candidates in the case of the merge correction flag of 0 may be predefined or coded in the SPS or PPS in the bitstream and acquired therefrom.

Thus, this variation curtails the process in the coding device and, at the same, inhibits the coding efficiency from dropping by determining whether or not to correct the merge candidate mode only in the case of the merge candidate that is relatively more likely to be selected, by configuring the maximum number of merge candidates in the case of the merge correction flag of 1 to be smaller than the maximum number of merge candidates in the case of the merge correction flag of 0. Since this makes it unnecessary to code (decode) the merge correction flag when the merge index is equal to or larger than the maximum number of corrected merge candidates, the coding efficiency is improved.

Second Embodiment

The configuration of the image coding device 100 and the image decoding device 200 according to the second embodiment is the same as that of the image coding device 100 and the image decoding device 200 according to the first embodiment. The second embodiment differs from the first embodiment in respect of the operation and syntax in the merge mode. A description will now be given of the difference between the second embodiment and the first embodiment.

Figure 13:
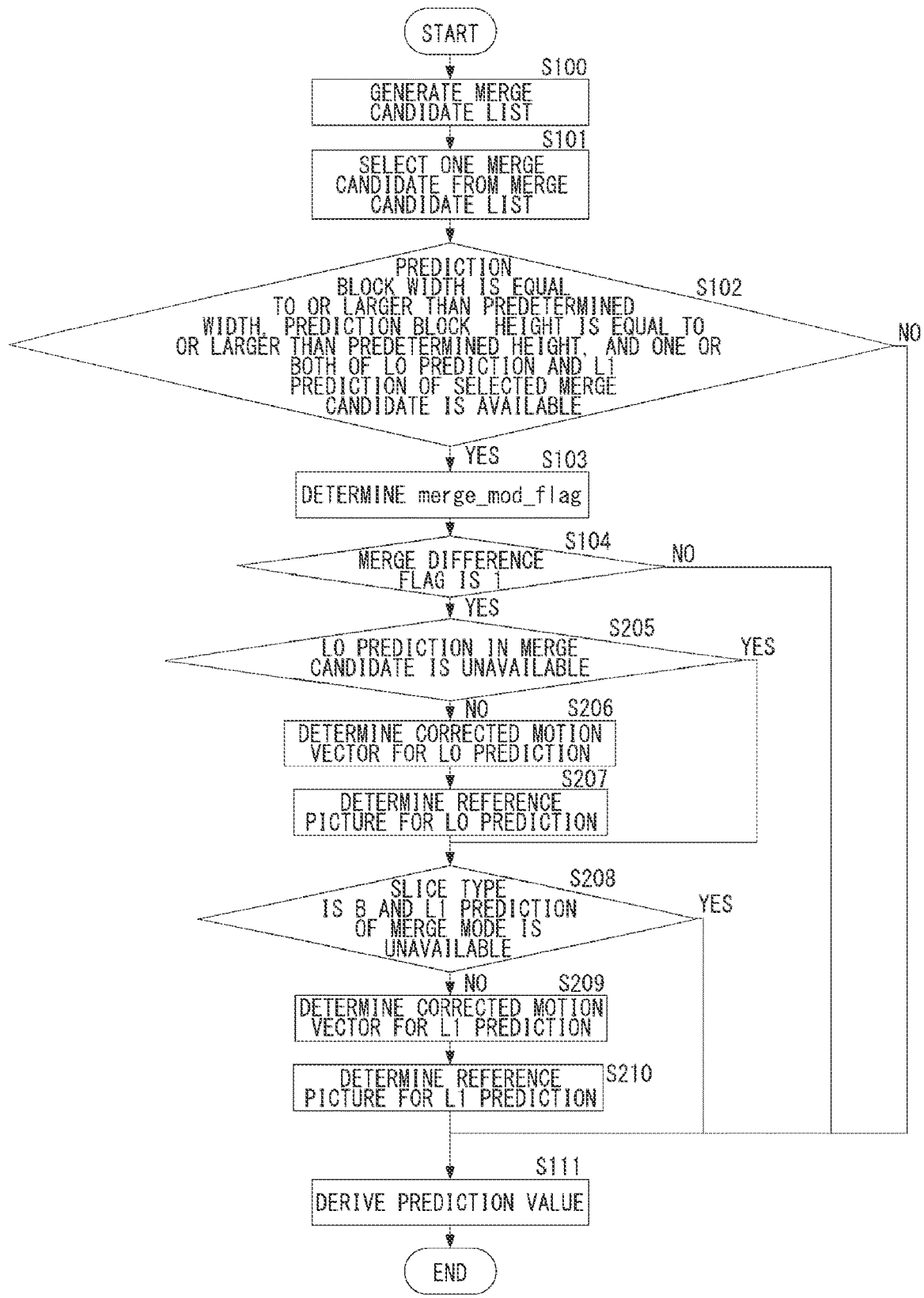
FIG. 13 is a flowchart for explaining the operation in the merge mode according to the second embodiment.

FIG. 13 is a flowchart for explaining the operation in the merge mode according to the second embodiment. FIG. 14 shows a part of the syntax of the block in the merge mode according to the second embodiment. FIG. 15 shows the syntax of the motion vector difference according to the second embodiment.

The difference from the first embodiment will be explained hereinafter, with reference to FIGS. 13, 14, and 15. FIG. 13 differs from FIG. 4 in respect of steps S205 through S207 and steps S109 through S211.

When the merge correction flag is 1 (YES in S104), whether L0 prediction of the selected merge candidate is unavailable is examined (S205). When L0 prediction of the selected merge candidate is not unavailable (NO in S205), control proceeds to step S208. When L0 prediction of the selected merge candidate is unavailable (YES in S205), the corrected motion vector for L0 prediction is determined (S206).

The inter prediction unit 120 of the image coding device 100 determines the corrected motion vector for L0 prediction through motion vector search. It is assumed here that the range searched for the motion vector is ±1 both in the horizontal direction and in the vertical direction. The inter prediction unit 220 of the image decoding device 200 acquires the corrected motion vector for L0 prediction from the bitstream.

The reference picture index for L0 prediction is then determined (S207). It is assumed here that the reference picture index for L0 prediction is 0.

Whether the slice type is B and L1 prediction of the selected merge candidate is unavailable is examined (S208). When the slice type is not B or L1 prediction of the selected merge candidate is not unavailable (NO in S208), control proceeds to S111. When the slice type is not B and L1 prediction of the selected merge candidate is unavailable (YES in S208), the corrected motion vector for L1 prediction is determined (S209).

The inter prediction unit 120 of the image coding device 100 determines the corrected motion vector for L1 prediction through motion vector search. It is assumed here that the range searched for the motion vector is ±1 both in the horizontal direction and in the vertical direction. The inter prediction unit 220 of the image decoding device 200 acquires the corrected motion vector for L1 prediction from the bitstream.

The reference picture index for L1 prediction is then determined (S110). It is assumed here that the reference picture index for L1 prediction is 0.

As described above, the merge candidate of L0 prediction or L1 prediction is converted in this embodiment into the merge candidate of bidirectional prediction, when the slice type is a type that permits bidirectional prediction (i.e., the slice type B). Conversion into the merge candidate of bidirectional prediction makes it possible to expect improvement in the prediction efficiency provided by the filtering effect. Also, by using the immediately neighboring decoded image as the reference picture, the range searched for the motion vector is controlled to be minimum.

[Variation]

In the embodiment, the reference picture index in step S207 and step 210 is defined to be 0. In this variation, the reference picture index for L0 prediction is defined to be the reference picture index for L1 prediction when L0 prediction of the selected merge candidate is unavailable. The reference picture index for L1 prediction is defined to be the reference picture index for L0 prediction when L1 prediction of the selected merge candidate is unavailable.

Thus, by filtering the prediction value from L0 prediction or L1 prediction of the selected by providing a small offset, a small motion can be reproduced, and the prediction efficiency can be improved.

The bitstream output by the image coding device according to the embodiments described above has a specified data format so that the bitstream can be decoded according to the coding method used in the embodiments. The bitstream may be stored in a recording medium such as HDD, SSD, flash memory, and optical disk that can be read from a computer etc. and provided accordingly. Alternatively, the bitstream may be made provided from a server via a wired or wireless network. Accordingly, the image decoding device compatible with the image coding device can decode the bitstream of the specified data format regardless of the means of provision.

When a wired or wireless network is used to exchange the bitstream between the image coding device and the image decoding device, the bitstream may be transformed into a data format suited to the transmission mode of the communication channel and transmitted accordingly. In that case, a transmission device that transforms the bitstream output by the image coding device into coded data of a data format suited to the transmission mode of the communication channel and a reception device that receives the coded data from the network, restoring the bitstream, and supplying the bitstream to the image decoding device are provided. The transmission device includes a memory that buffers the bitstream output by the image coding device, a packet processing unit that packetizes the bitstream, and a transmission unit that transmits the packetized coded data via the network. The reception device includes a reception unit that receives the packetized coded data via the network, a memory that buffers the received coded data, and a packet processing unit that subjects the coded data to a packet process to generate the bitstream and provides the bitstream to the image decoding device.

When a wired or wireless network is used to exchange a bitstream between the image coding device and the image decoding device, a relay device that receives the bitstream data transmitted by the transmission device and supplies the data to the reception device may be provided in addition to the transmission device and the reception device. The relay device includes a reception unit that receives the packetized coded data transmitted by the transmission device, a memory that buffers the coded data received, and a transmission unit that transmits the packetized coded data to the network. The relay device may further include a received packet processing unit that subjects the packetized coded data to a packet process to generate the bitstream, a recording medium that stores the bitstream, and a transmission packet processing unit that packetizes the bitstream.

Further, a display device may be provided by adding a display unit that displays the image decoded by the image decoding device. Further, an imaging device may be provided by adding an imaging unit and inputting the captured image to the image coding device.

Figure 18:
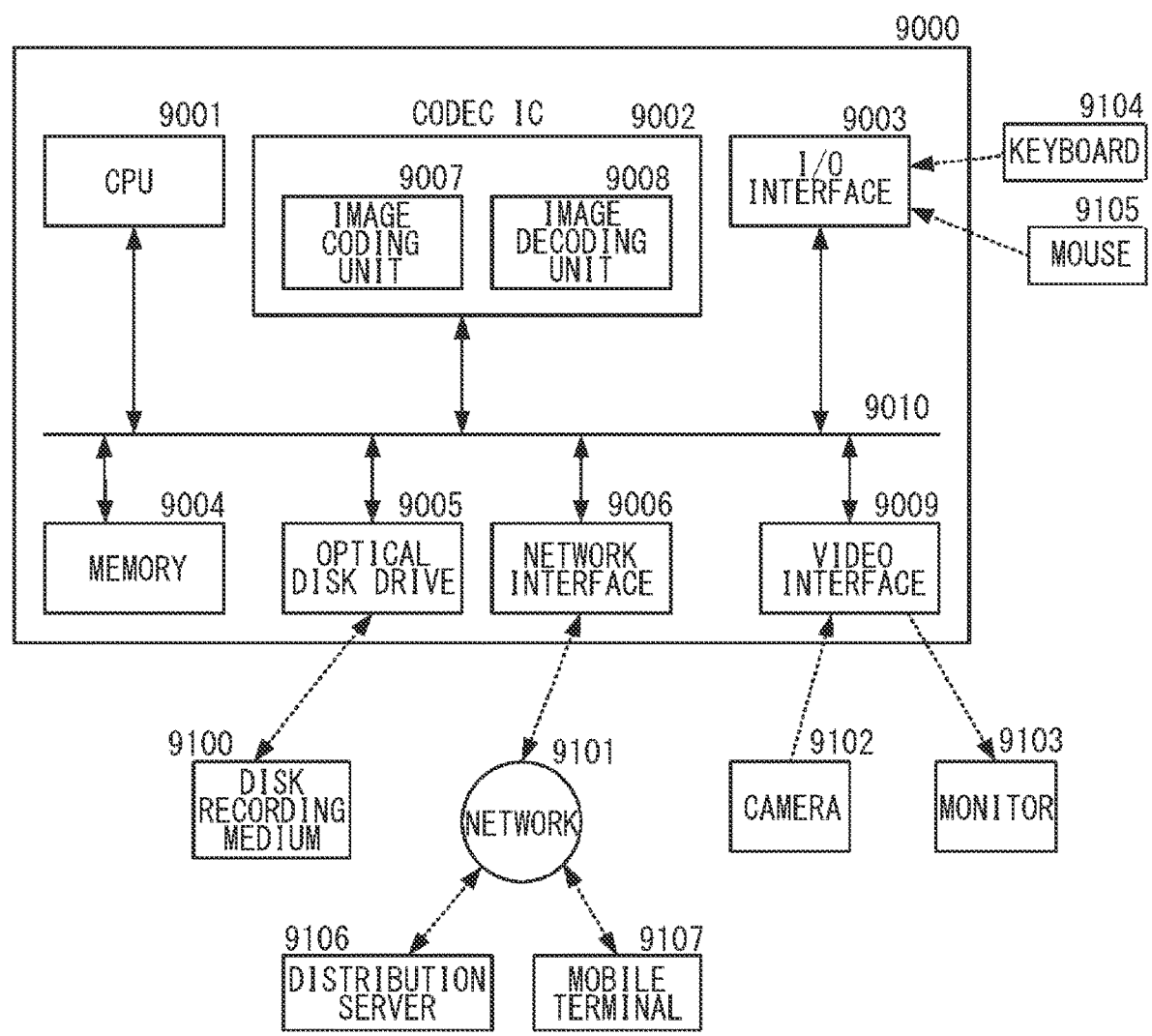
FIG. 18 shows an exemplary hardware configuration of the coding and decoding device of the first embodiment.

FIG. 18 shows an exemplary hardware configuration of the coding and decoding device of the present application. The coding and decoding device includes the configurations of the image coding device and the image decoding device according to the embodiments. A coding and decoding device 9000 includes a CPU 9001, a codec IC 9002, an I/O interface 9003, a memory 9004, an optical disk drive 9005, a network interface 9006, and a video interface 9009. The parts are connected by a bus 9010.

An image coding unit 9007 and an image decoding unit 9008 are typically implemented as the codec IC 9002.

The image coding process of the image coding device according to the embodiments is executed by the image coding unit 9007, and the image decoding process of the image decoding device according to the embodiments is executed by the image coding unit 9007. The I/O interface 9003 is implemented by, for example, a USB interface and is connected to an external keyboard 9104, a mouse 9105, etc. The CPU 9001 controls the coding and decoding device 9000 to perform the process desired by the user, based on the user operation input via the I/O interface 9003. The user operation via the keyboard 9104, the mouse 9105, etc. includes the selection of either coding or decoding, setting of the coding quality, input and output destinations of the bitstream, input and output destinations of the image, etc.

When the user desires an operation of playing the image recorded in a disk recording medium 9100, the optical disk drive 9005 reads the bitstream from the inserted disk recording medium 9100 and sends the bitstream thus read to the image decoding unit 9008 of the codec IC 9002 via the bus 9010. The image decoding unit 9008 subjects the input bitstream to the image decoding process in the image decoding device according to the embodiments and sends the decoded image to an external monitor 9103 via a video interface 9009. Further, the coding and decoding device 9000 has a network interface 9006 and can be connected to an external distribution server 9106 or a mobile terminal 9107 via a network 9101. When the user desires to play the image recorded in the distribution server 9106 or the mobile terminal 9107 instead of the image recorded in the disk recording medium 9100, the network interface 9006 acquires the bitstream from the network 9101 instead of reading the bitstream from the input disk recording medium 9100. When the user desires to play the image recorded in the memory 9004, the bitstream recorded in the memory 9004 is subject to the image decoding process in the image decoding device according to the embodiments.

When the user desires an operation to code the image captured by an external camera 9102 and record the coded image in the memory 9004, the video interface 9009 receives the image from the camera 9102 and sends the image to the image coding unit 9007 of the codec IC 9002 via the bus 9010. The image coding unit 9007 subjects the image input via the video interface 9009 to the image coding process in the image coding device according to the embodiments to generate the bitstream. The image coding unit 9007 sends the bitstream to the memory 9004 via the bus 9010. When the user desires to record the bitstream in the disk recording medium 9100 instead of the memory 9004, the optical disk drive 9005 writes the bitstream in the inserted disk recording medium 9100.

It is also possible to implement hardware configuration that includes the image coding device but does not include the image decoding device or hardware configuration that includes the image decoding device and does not include the image coding device. Such hardware configuration is implemented by, for example, replacing the codec IC 9002 by the image coding unit 9007 or the image decoding unit 9008, respectively.

The above-described processes related to coding and decoding can of course be implemented as a transfer device, storage device, reception device in which hardware such as ASIC is used and can also be implemented by firmware stored in a read-only memory (ROM), a flash memory, etc. or by software for a CPU, a System On Chip (SOC) computer, etc. The firmware program or the software program may be recorded on a recording medium that can be read from, for example, a computer and provided accordingly. Alternatively, the program may be made available from a server via a wired or wireless network. Still alternatively, the program may be made available in the form of data broadcast over terrestrial or satellite digital broadcast systems.

Described above is an explanation based on an exemplary embodiment. The embodiment is intended to be illustrative only and it will be understood by those skilled in the art that various modifications to combinations of constituting elements and processes are possible and that such modifications are also within the scope of the present invention.

What is claimed is:

1. An image decoding device comprising:
   a merge candidate list generation unit that generates a merge candidate list including, as a merge candidate, motion information on a plurality of blocks neighboring a block subject to prediction and motion information having a motion vector derived by scaling a motion vector of a block on a decoded image located at the same position as the block subject to prediction;
   a merge candidate selection unit that selects, as a selected merge candidate, a merge candidate from the merge candidate list;
   a bitstream decoding unit that decodes a bitstream to derive a motion vector difference; and
   a merge candidate correction unit that derives a corrected merge candidate of bidirectional prediction by adding the motion vector difference to a motion vector of the selected merge candidate for a first prediction without scaling and subtracting the motion vector difference from a motion vector of the selected merge candidate for a second prediction without scaling, when a reference picture of the selected merge candidate for a first prediction or a reference picture of the selected merge candidate for a second prediction is a long-term reference picture and derives a corrected merge candidate of bidirectional prediction by adding the motion vector difference, which is scaled in accordance with an interval between a picture subject to prediction and the reference picture, to a motion vector of the selected merge candidate for a first prediction and subtracting the motion vector difference, which is scaled in accordance with an interval between a picture subject to prediction and the reference picture, from a motion vector of the selected merge candidate for a second prediction, when the reference picture of the selected merge candidate for the first prediction is not a long-term reference picture and the reference picture of the selected merge candidate for the second prediction is not a long-term reference picture.

2. An image decoding method comprising:
   generating a merge candidate list including, as a merge candidate, motion information on a plurality of blocks neighboring a block subject to prediction and motion information having a motion vector derived by scaling a motion vector of a block on a decoded image located at the same position as the block subject to prediction;
   selecting, as a selected merge candidate, a merge candidate from the merge candidate list;
   decoding a bitstream to derive a motion vector difference; and
   deriving a corrected merge candidate of bidirectional prediction by adding the motion vector difference to a motion vector of the selected merge candidate for a first prediction without scaling and subtracting the motion vector difference from a motion vector of the selected merge candidate for a second prediction without scaling, when a reference picture of the selected merge candidate for a first prediction or a reference picture of the selected merge candidate for a second prediction is a long-term reference picture and deriving a corrected merge candidate of bidirectional prediction by adding the motion vector difference, which is scaled in accordance with an interval between a picture subject to prediction and the reference picture, to a motion vector of the selected merge candidate for a first prediction and subtracting the motion vector difference, which is scaled in accordance with an interval between a picture subject to prediction and the reference picture, from a motion vector of the selected merge candidate for a second prediction, when the reference picture of the selected merge candidate for the first prediction is not a long-term reference picture and the reference picture of the selected merge candidate for the second prediction is not a long-term reference picture.

3. A recording medium encoded with an image decoding program, the program comprising computer-implemented modules including:

a module that generates a merge candidate list including, as a merge candidate, motion information on a plurality of blocks neighboring a block subject to prediction and motion information having a motion vector derived by scaling a motion vector of a block on a decoded image located at the same position as the block subject to prediction;

a module that selects, as a selected merge candidate, a merge candidate from the merge candidate list;

a module that decodes a bitstream to derive a motion vector difference; and a module that derives a corrected merge candidate of bidirectional prediction by adding the motion vector difference to a motion vector of the selected merge candidate for a first prediction without scaling and subtracting the motion vector difference from a motion vector of the selected merge candidate for a second prediction without scaling, when a reference picture of the selected merge candidate for a first prediction or a reference picture of the selected merge candidate for a second prediction is a long-term reference picture and derives a corrected merge candidate of bidirectional prediction by adding the motion vector difference, which is scaled in accordance with an interval between a picture subject to prediction and the reference picture, to a motion vector of the selected merge candidate for a first prediction and subtracting the motion vector difference, which is scaled in accordance with an interval between a picture subject to prediction and the reference picture, from a motion vector of the selected merge candidate for a second prediction, when the reference picture of the selected merge candidate for the first prediction is not a long-term reference picture and the reference picture of the selected merge candidate for the second prediction is not a long-term reference picture.

4. An image coding device comprising:

a merge candidate list generation unit that generates a merge candidate list including, as a merge candidate, motion information on a plurality of blocks neighboring a block subject to prediction and motion information having a motion vector derived by scaling a motion vector of a block on a coded image located at the same position as the block subject to prediction;

a merge candidate selection unit that selects, as a selected merge candidate, a merge candidate from the merge candidate list;

a merge candidate correction unit that derives a corrected merge candidate of bidirectional prediction by adding a motion vector difference to a motion vector of the selected merge candidate for a first prediction without scaling and subtracting the motion vector difference from a motion vector of the selected merge candidate for a second prediction without scaling, when a reference picture of the selected merge candidate for a first prediction or a reference picture of the selected merge candidate for a second prediction is a long-term reference picture and derives a corrected merge candidate of bidirectional prediction by adding the motion vector difference, which is scaled in accordance with an interval between a picture subject to prediction and the reference picture, to a motion vector of the selected merge candidate for a first prediction and subtracting the motion vector difference, which is scaled in accordance with an interval between a picture subject to prediction and the reference picture, from a motion vector of the selected merge candidate for a second prediction, when the reference picture of the selected merge candidate for the first prediction is not a long-term reference picture and the reference picture of the selected merge candidate for the second prediction is not a long-term reference picture; and a bitstream coding unit that codes the motion vector difference into a bitstream.

5. An image coding method comprising:

generating a merge candidate list including, as a merge candidate, motion information on a plurality of blocks neighboring a block subject to prediction and motion information having a motion vector derived by scaling a motion vector of a block on a coded image located at the same position as the block subject to prediction;

selecting, as a selected merge candidate, a merge candidate from the merge candidate list;

deriving a corrected merge candidate of bidirectional prediction by adding a motion vector difference to a motion vector of the selected merge candidate for a first prediction without scaling and subtracting the motion vector difference from a motion vector of the selected merge candidate for a second prediction without scaling, when a reference picture of the selected merge candidate for a first prediction or a reference picture of the selected merge candidate for a second prediction is a long-term reference picture and derives a corrected merge candidate of bidirectional prediction by adding the motion vector difference, which is scaled in accordance with an interval between a picture subject to prediction and the reference picture, to a motion vector of the selected merge candidate for a first prediction and subtracting the motion vector difference, which is scaled in accordance with an interval between a picture subject to prediction and the reference picture, from a motion vector of the selected merge candidate for a second prediction, when the reference picture of the selected merge candidate for the first prediction is not a long-term reference picture and the reference picture of the selected merge candidate for the second prediction is not a long-term reference picture; and coding the motion vector difference into a bitstream.

6. A recording medium encoded with an image coding program, the program comprising computer-implemented modules including:

a module that generates a merge candidate list including, as a merge candidate, motion information on a plurality of blocks neighboring a block subject to prediction and motion information having a motion vector derived by scaling a motion vector of a block on a coded image located at the same position as the block subject to prediction;

a module that selects, as a selected merge candidate, a merge candidate from the merge candidate list;

a module that derives a corrected merge candidate of bidirectional prediction by adding a motion vector difference to a motion vector of the selected merge candidate for a first prediction without scaling and subtracting the motion vector difference from a motion vector of the selected merge candidate for a second prediction without scaling, when a reference picture of the selected merge candidate for a first prediction or a reference picture of the selected merge candidate for a second prediction is a long-term reference picture and derives a corrected merge candidate of bidirectional prediction by adding the motion vector difference, which is scaled in accordance with an interval between a picture subject to prediction and the reference picture, to a motion vector of the selected merge candidate for a first prediction and subtracting the motion vector difference, which is scaled in accordance with an interval between a picture subject to prediction and the reference picture, from a motion vector of the selected merge candidate for a second prediction, when the reference picture of the selected merge candidate for the first prediction is not a long-term reference picture and the reference picture of the selected merge candidate for the second prediction is not a long-term reference picture; and a module that codes the motion vector difference into a bitstream.

\* \* \* \* \*